(12) United States Patent
Okabe

(10) Patent No.: US 7,084,930 B2
(45) Date of Patent: Aug. 1, 2006

(54) DIGITAL RECEIVER

(75) Inventor: Kenichiro Okabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 500 days.

(21) Appl. No.: 10/146,529

(22) Filed: May 15, 2002

(65) Prior Publication Data
US 2002/0171775 A1    Nov. 21, 2002

(30) Foreign Application Priority Data
May 15, 2001 (JP) ............... P.2001-144849

(51) Int. Cl.
*H04N 5/50* (2006.01)

(52) U.S. Cl. ............... 348/731; 348/732; 348/726; 348/385.1; 348/569; 348/570; 348/706

(58) Field of Classification Search ........ 348/731–732, 348/725–728, 385.1, 563, 569–570, 705–706; 725/38, 50, 56, 68, 85, 100, 131, 139, 151; H04N 5/50
See application file for complete search history.

(56) References Cited

U.S. PATENT DOCUMENTS

| | | | | |
|---|---|---|---|---|
| 5,585,866 A * | 12/1996 | Miller et al. | ................... | 725/43 |
| 5,594,492 A * | 1/1997 | O'Callaghan et al. | ...... | 725/151 |
| 5,600,378 A * | 2/1997 | Wasilewski | ................. | 348/468 |
| 5,642,153 A * | 6/1997 | Chaney et al. | ................ | 725/40 |
| 5,864,358 A * | 1/1999 | Suzuki et al. | ............... | 725/142 |
| 5,959,659 A * | 9/1999 | Dokic | ........................ | 725/152 |
| 5,982,411 A * | 11/1999 | Eyer et al. | .................... | 725/49 |
| 6,115,080 A * | 9/2000 | Reitmeier | ................... | 348/731 |
| 6,137,539 A * | 10/2000 | Lownes et al. | ............. | 348/569 |
| 6,249,320 B1 * | 6/2001 | Schneidewend et al. | .... | 348/569 |
| 6,442,757 B1 * | 8/2002 | Hancock et al. | ............. | 725/50 |
| 6,490,001 B1 * | 12/2002 | Shintani et al. | ............ | 348/554 |
| 6,598,233 B1 * | 7/2003 | Choi | ......................... | 725/151 |
| 6,621,528 B1 * | 9/2003 | Kessler et al. | .............. | 348/734 |
| 6,661,472 B1 * | 12/2003 | Shintani et al. | ............. | 348/732 |
| 6,700,624 B1 * | 3/2004 | Yun | .......................... | 348/555 |
| 6,718,552 B1 * | 4/2004 | Goode | ......................... | 725/95 |
| 6,721,018 B1 * | 4/2004 | Shintani et al. | ............. | 348/731 |
| 6,741,288 B1 * | 5/2004 | Kessler | .................... | 348/385.1 |
| 6,775,843 B1 * | 8/2004 | McDermott | ................. | 725/151 |
| 6,785,903 B1 * | 8/2004 | Kuh | .......................... | 725/50 |
| 6,919,930 B1 * | 7/2005 | Barreyro et al. | ............ | 348/723 |
| 6,934,917 B1 * | 8/2005 | Lin | ............................ | 715/811 |
| 6,950,151 B1 * | 9/2005 | Wrife | ......................... | 348/731 |
| 2002/0089603 A1 * | 7/2002 | Onomatsu | ................... | 348/554 |
| 2002/0112248 A1 * | 8/2002 | Takagi et al. | ............... | 725/131 |
| 2004/0150746 A1 * | 8/2004 | Shimamoto | ................. | 348/553 |
| 2004/0268412 A1 * | 12/2004 | Kim | .......................... | 725/126 |
| 2005/0132413 A1 * | 6/2005 | Barreyro et al. | ............ | 725/100 |
| 2006/0033843 A1 * | 2/2006 | Klopfenstein et al. | ...... | 348/570 |

* cited by examiner

Primary Examiner—Brian P. Yenke
(74) Attorney, Agent, or Firm—Osha Liang L.L.P.

(57) ABSTRACT

In a receiver, immediately after the channel-up key or channel-down key is operated, the receiver 1 starts a tuning motion of tuning in to a program which is being broadcast by the virtual channel number corresponding to the operation. When the channel-up key or channel-down key is operated, if it is in the middle of tuning in to a channel corresponding to a previous operation, the tuning motion is stopped, and a tuning motion of a program, which is being broadcast by the virtual channel number corresponding to the operation of this time, is started.

6 Claims, 4 Drawing Sheets

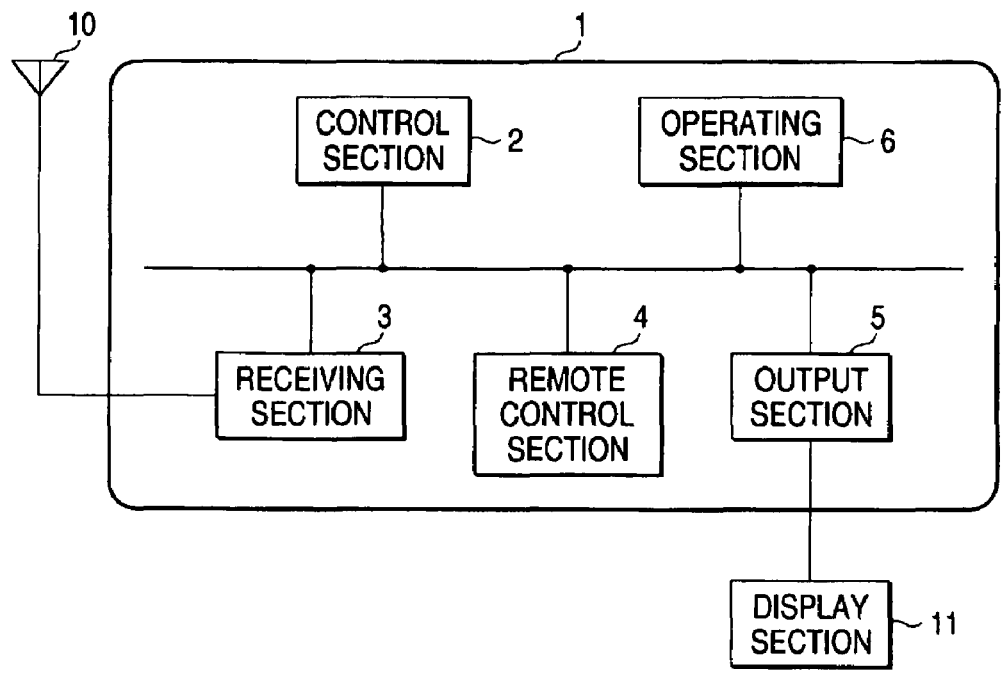

FIG. 3A

| VCT | |
|---|---|
| PROGRAM CHANNEL | PHYSICAL CHANNEL |
| 1-1 | 1CH |
| 1-2 | 1CH |
| 1-3 | 1CH |

FIG. 3B

| VCT | |
|---|---|
| PROGRAM CHANNEL | PHYSICAL CHANNEL |
| 2-1 | 2CH |
| 2-2 | 2CH |

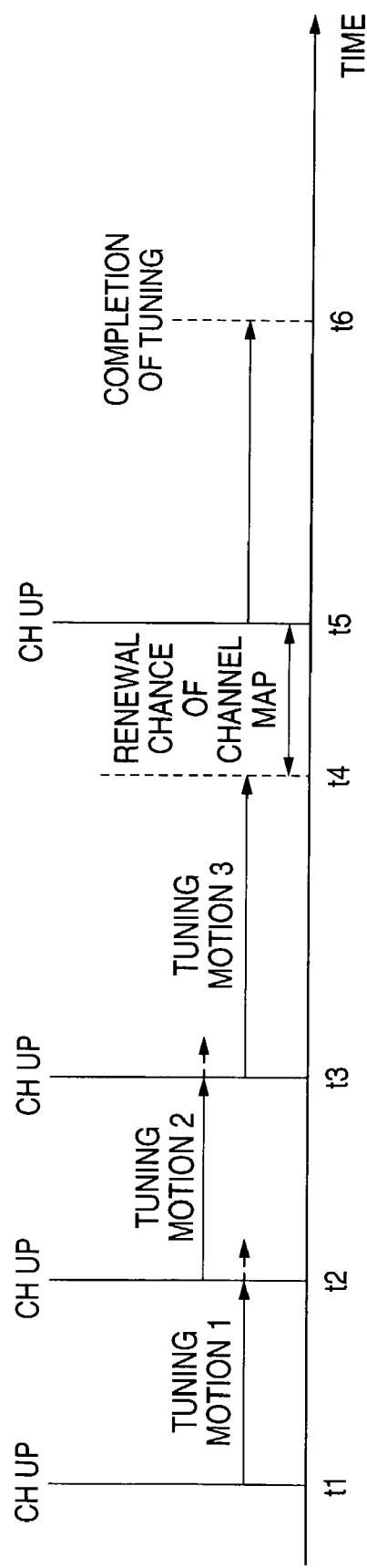

DIGITAL RECEIVER

BACKGROUND OF THE INVENTION

1. Field of the Invention

The present invention relates to a receiver applied to a television set for receiving a digital broadcast.

2. Description of the Related Art

Conventionally, one program is broadcast by only one physical channel in analog broadcasting. In this case, the physical channel is defined as a frequency band of carrier waves used for broadcasting a program. By a receiver of analog broadcasting, a channel to be received is switched by switching a frequency to be received. Therefore, when a user tunes in to a frequency of a channel to be received, images and voices of a program, which is being broadcast in this channel, can be instantly outputted. In a receiver of analog broadcasting, in order to select a program easily, there is provided a channel-up/channel-down function by which a receiving channel can be switched in the order of an increase or decrease in the channel number.

The channel-up/channel-down function is executed when a channel-up key or channel-down key provided in a main body or remote control unit is operated.

Recently, digital broadcasting, in which a plurality of programs can be broadcast by one physical channel, for example, digital broadcasting by Advanced Television Standards Committee System (ATSC system) has started. In digital broadcasting, a plurality of multiplex virtual channels are formed in a physical channel, and a program is broadcast for each virtual channel. Concerning the receiver of digital broadcasting, it is proposed to provide the above channel-up/channel-down function so that a program can be easily selected.

In this connection, digital broadcasting is conducted while images and voices are being compressed. Therefore, in order to output the images and voices in the receiving channel, it necessary to expand the received digital broadcasting signal. Accordingly, it takes a few seconds (2 to 3 seconds) from the switching operation of the channel to the output of the images and voices of a program which is being broadcast in the indicated receiving channel. For the above reasons, when the channel-up key or channel-down key is continuously operated by a user, according to the conventional channel-up/channel-down function in which the channel tuning motion is conducted by the number of times of operation, it takes long time until the images and voices of the program, which the user has determined to watch and listen to, are outputted, that is, the operation property is not good.

In order to solve the above problems, there is proposed a receiver (Japanese Unexamined Patent Publication No. 0-42212) in which only the number of a selected channel is successively switched while the channel-up key or channel-down key is being continuously operated, and the tuning motion is not executed. In this receiver, the time at which operation of the channel-up key or channel-down key is completed, that is, the time at which the receiving channel has been decided is detected, and the tuning motion for the receiving channel is started at this timing.

In this connection, as described before, in digital broadcasting, a plurality of programs are broadcast in one physical channel. Therefore, there are two channels, one is a physical channel showing a physical channel and the other is a multiplex virtual channel. The receiving channel is selected from the virtual channel.

However, in digital broadcasting, the number of programs which are being broadcast in the physical channel, that is, the number of virtual channels is dynamically changing. Therefore, information (VCT (Virtual Channel Table)) showing attributes of all virtual channels, in the physical channel of which programs are broadcast, are included in the digital broadcasting signals at a predetermined time. When the receiver receives this VCT, it is possible for the receiver to recognize the number of programs (the number of virtual channels) which are being broadcast in each physical channel.

Specifically, a channel map, on which the virtual channels in which programs are being broadcast are registered, is stored for each physical channel, and the channel map is renewed according to the received VCT. Therefore, the channel map is renewed for each physical channel when the digital broadcasting signals, which are being broadcast in the physical channel, are received.

Usually, in the above channel-up/channel-down function, the receiving channel is successively switched according to the registration content of the channel map. Therefore, the following problems may be encountered. Unless the channel map is renewed, a virtual channel in which a program is being broadcast is not tuned in, or a virtual channel in which a program is not being broadcast is tuned in, that is, the tuning operation becomes complicated.

In the receiver disclosed in Japanese Unexamined Patent Publication No. 10-42212, when the receiving channel is switched by the channel-up/channel-down function, the tuning motion is not carried out until a user decides the receiving channel. Therefore, the channel map is not renewed at this time (The digital broadcasting signal is not received.). Accordingly, there is a high possibility that the above problems are caused. Since the tuning motion is started after the receiving channel has been decided, it takes long time from the completion of switching the receiving channel to the output of images of the program which is being broadcast in the receiving channel.

SUMMARY OF THE INVENTION

It is an object of the present invention to provide a receiver characterized in that a period of time from the completion of switching operation conducted by a user to the output of an image of a program, which is being broadcast in a designated receiving channel, is reduced.

It is another object of the present invention to provide a receiver characterized in that even when the receiving channel switching operation is being continuously conducted by the channel-up/channel-down function, the channel map can be renewed.

In order to solve the above problems, the receiver of the present invention is composed as follows.

(1) A receiver comprises:

a receiving means for receiving a digital broadcasting signal of a program to be broadcast in a plurality of channels;

a channel number indicating means for indicating a channel number to be switched; and a tuning means for tuning a channel corresponding to a channel number indicated by the channel number indicating means, the channel number indicating means including a channel-up/channel-down means for indicating the order of increasing or decreasing a channel number to be switched, wherein the tuning means starts the tuning of a channel corresponding to the indicated channel number at the time at which the channel number to be switched by the channel-up/channel-down is indicated.

(2) The tuning means stops a tuning motion if the tuning means is in the middle of tuning a channel corresponding to the channel number indicated before when the channel number to be switched by the channel-up/channel-down means is indicated, and the tuning means starts the tuning of a channel corresponding to the channel number indicated this time.

(3) The digital broadcasting signal includes a signal of a program to be broadcast for each virtual channel when multiplex virtual channels are formed in the physical channel.

(4) The digital broadcasting signal includes attribute information showing an attribute of the virtual channel, and the receiver further comprises a channel map storing means for storing a channel map on which attribute information of the virtual channel, which is multiplex in the physical channel, is stored for each physical channel.

(5) A receiver further comprises a channel map renewing means for renewing the channel map when the receiving means receives the attribute information included in the digital broadcasting signal.

According to the structure described in the above item (1), the tuning motion of tuning in to the indicated receiving channel is started by the channel-up/channel-down means at the time of the indication of the switching of the receiving channel. Therefore, it is possible to reduce a period of time from the completion of the receiving channel selecting operation conducted by a user to the output of images and voices in the program which is being broadcast in the selected receiving channel.

In the structure described in the above item (2), when the channel switching is indicated by the channel-up/channel-down means, if it is in the middle of tuning in to a channel corresponding to the channel number indicated last time, this tuning motion is stopped, and the channel tuning motion of tuning in to a channel corresponding to the channel number indicated this time is started. Due to the foregoing, even when the channel switching operation is continuously conducted by the channel-up/channel-down means, it is possible to reduce a period of time from the completion of the channel tuning operation conducted by a user to the output of images and voices of the program which is being broadcast in the selected channel.

Further, when the channel switching operation is continuously conducted by the channel-up/channel-down means, if the channel tuning motion is completed earlier than the channel switching operation conducted by the user, the channel map can be renewed.

BRIEF DESCRIPTION OF THE DRAWINGS

FIG. 1 is a block diagram showing an arrangement of a receiver of an embodiment of the present invention;

FIG. 2 is a view showing a channel map in a receiver of an embodiment of the present invention;

FIGS. 3A and 3B are views for explaining VCT in digital broadcasting;

FIG. 5 is a timing chart showing a tuning motion utilizing a channel-up/channel-down function of a receiver of an embodiment of the present invention.

DETAILED DESCRIPTION OF THE PREFERRED EMBODIMENTS

Figure 4:
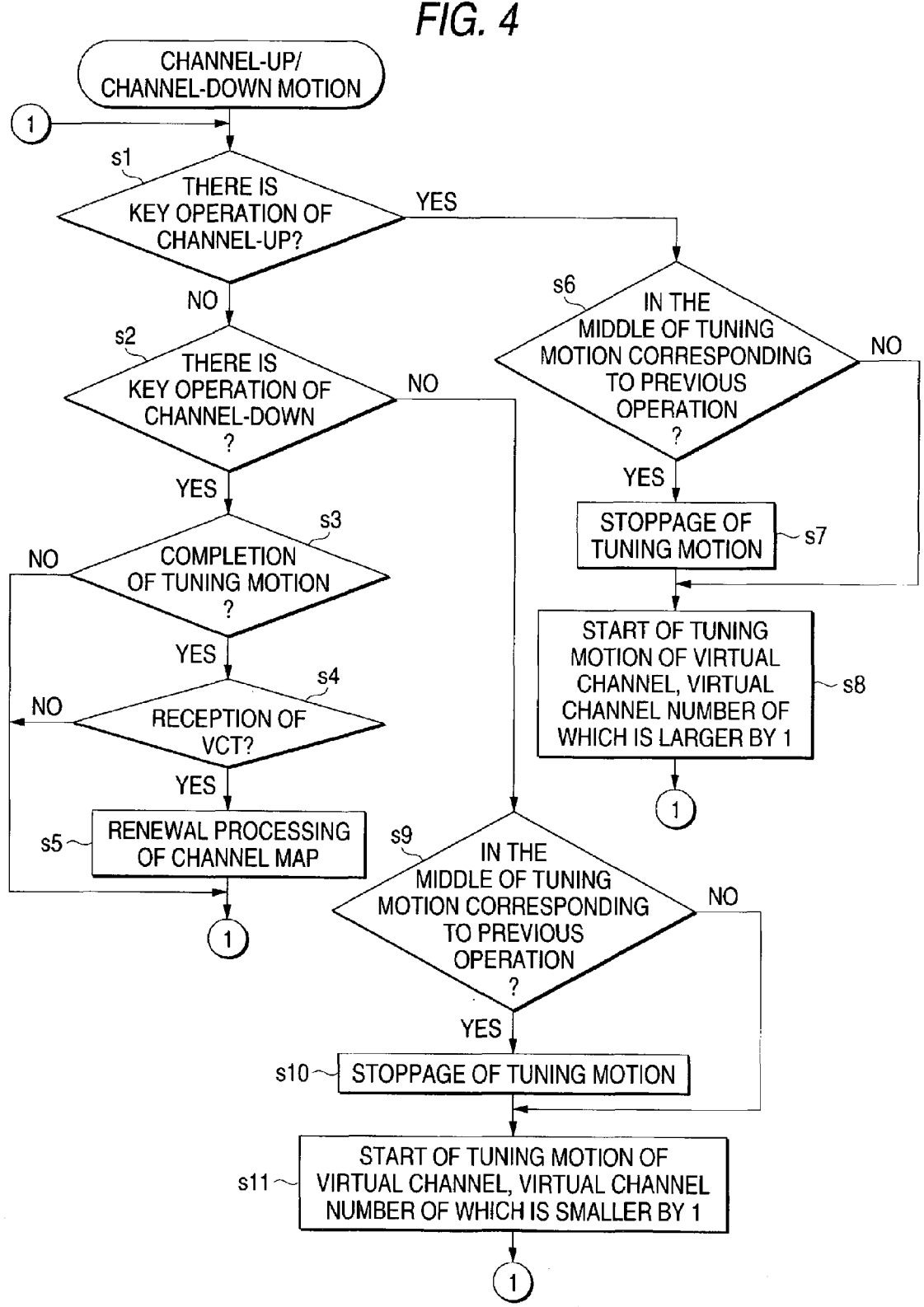
FIG. 4 is a flow chart showing a tuning motion utilizing a channel-up/channel-down function of a receiver of an embodiment of the present invention.

Now, a description will be given in more detail of preferred embodiments of the invention with reference to the accompanying drawings.

FIG. 1 is a block diagram showing an arrangement of a receiver which is an embodiment of the present invention. The receiver 1 of this embodiment is a receiver used for receiving digital broadcasting of ATSC (Advanced Television Standards Committee) system. The control section 2 controls a motion of the receiver body 1. The receiving section 3 picks up signals of a program, which is being broadcast in a channel, selected from digital signals received by the antenna 10, and decodes the signals to image and voice signals. The remote control receiving section 4 receives a control signal sent from a remote control unit not shown by infrared rays or electric waves, for example, the remote control receiving section 4 receives a channel switching signal. The output section 5 outputs an image signal and a voice signal decoded by the receiving section 3. The display section 11 displays an image according to the image signal outputted from the output section 5. At the same time, the display section 11 outputs a voice according to the voice signal. The operating section 6 is provided with keys operated when the channel is switched.

In digital broadcasting, it is possible to form a plurality of multiplex virtual channels in the physical channel, and it is also possible to broadcast a program for each virtual channel. That is, it is possible to broadcast a plurality of programs in one physical channel.

In this case, the physical channel is defined as a frequency band of carrier waves used for broadcasting a program. Therefore, in digital broadcasting, there are provided two channel numbers, one is a channel number corresponding to the physical channel (referred to as a physical channel number hereinafter) and the other is a channel number corresponding to the virtual channel (referred to as a virtual channel number hereinafter). When the channel is switched, the number is indicated by the virtual channel number.

In the control section 2, there is provided a storage section (RAM) for storing the channel map 15 shown below. Further, in order to prevent the channel map 15 from disappearing in the case where the electric power source of the device body is turned off, a non-volatile memory for storing the channel map 15 is provided in the control section 2. When the electric power source is turned on, the channel map 15 stored in the non-volatile memory is read out and operation of the main body is controlled by the channel map 15.

FIG. 2 is a view showing a channel map. On the channel map 15, information is registered corresponding to multiplex virtual channels in each physical channel. In the example shown in FIG. 2, it is shown that three programs, the virtual channel numbers of which are 1-1, 1-2 and 1-3, are broadcast in the physical channel number 1. Further, it is shown that two programs, the virtual channel numbers of which are 2-1 and 2-2, are broadcast in the physical channel number 2. Furthermore, it is shown that two programs, the virtual channel numbers of which are 4-1 and 4-2, are broadcast in the physical channel number 4.

The receiving section 3 includes: a tuner for picking up an indicated physical channel signal and intermediate frequency signal (IF signal) from the received broadcasting signal, the tuner outputting the indicated physical channel signal and intermediate frequency signal (IF signal); a SAW filter for leaking the IF signal, which has been picked up by the tuner, to a signal in a predetermined frequency band; an expanding section for A/D converting and expanding the IF signal which has been leaked through the SAW filter; and a decoding section for decoding the signal which has been expanded by the expanding section.

In this connection, the decoding section does not decode a broadcasting signal of a program which is being broadcast by a virtual channel number not indicated. For example, in the case where three programs of the virtual channel numbers 1-1, 1-2 and 1-3 are being broadcast in the physical channel number 1, when the virtual channel number 1-2 is indicated, the broadcasting signals of the programs, the virtual channel numbers of which are 1-1 and 1-3, are not decoded.

In digital broadcasting, the number of programs, which are being broadcast in the physical channel, that is, the number of virtual channels are dynamically changing. Therefore, information (VCT(Virtual Channel Table)) showing attributes of all virtual channels, which are being broadcast in the physical channel, are included in the digital broadcasting signal. By this VCT, the receiver 1 recognizes the number of programs (the number of virtual channels) which are being broadcast in the physical channel. FIG. 3A shows VCT included in the digital broadcasting signal which is being broadcast in the physical channel. FIG. 3B shows VCT included in the digital broadcasting signal of a program which is being broadcast in the physical channel 2.

When the receiver 1 receives an indicated virtual channel, the receiver 1 can receive VCT of the physical channel in which this virtual channel is formed.

When the received VCT is different from the content of registration of the physical channel concerned on the channel map 15, the channel map 15 is renewed according to the received VCT.

In the receiver 1 of this embodiment, there is provided a channel-up/channel-down function by which a receiving channel can be switched in the order of an increase or decrease in the virtual channel number registered on the channel map 15. In the operating section 6, there are provided channel-up keys operated in the case of switching a channel in the order of an increase in the virtual channel number, and there are also provided channel-down keys operated in the case of switching a channel in the order of a decrease in the virtual channel number. Further, there are provided channel-up keys and channel-down keys in the remote control unit.

Explanations will be made into a tuning motion in which the channel-up/channel-down function of the receiver 1 of this embodiment is utilized. FIG. 4 is a flow chart showing a tuning motion in which this channel-up/channel-down function is utilized. FIG. 5 is a timing chart showing a tuning motion in which this channel-up/channel-down function is utilized.

The receiver 1 judges whether or not the channel-up key or channel-down key provided on the operating section 6 is operated (s1, s2). In this connection, in s1 and s2, it is also judged whether or not the channel-up key or channel-down key is operated in the remote control unit and whether or not a control signal has been sent according to the operation.

When it is judged that the channel-up key has been operated, the receiver 1 judges whether or not it is in the middle of a tuning motion corresponding to the previous operation of the channel-up key (s6). In this case, "It is in the middle of a tuning motion." is defined as a state in which images and voices of a program, which is being broadcast in the channel indicated by the output section 5, have not been outputted yet. When it is judged that it is in the middle of a tuning motion corresponding to the previous operation of the channel-up key in s6, the tuning motion is stopped (s7), and a tuning motion of tuning in to a channel, the virtual channel number of which is larger by 1, is started, that is, a tuning motion corresponding to the operation of the channel-up key of this time is started (s8).

In this connection, when the receiver 1 judges that it is not in the middle of a tuning motion in s6, while omitting the processing in s7, the receiver 1 starts a tuning motion of a channel, the virtual channel number of which is larger by 1, in s8.

Referring to FIG. 5, motions of s6 to s8 described above will be explained below. When the channel-up key is operated at time t1 shown in FIG. 5 (Time t1 is time at which a tuning motion is not conducted.), the tuning motion 1 for a channel, the virtual channel number of which is larger by 1, is immediately started. When the channel-up key is operated again at time t2 at which the tuning motion 1 started at time t1 is not completed, the tuning motion 1 (tuning motion for the previous operation of the channel-up key) started at time t1 is stopped, and the tuning motion 2 (tuning motion corresponding to the operation of the channel-up key of this time) for a channel, the virtual channel number of which is larger by 1, is started. In the same manner, when the channel-up key is operated again at time t3 at which the tuning motion 2 started at time t2 is not completed, the tuning motion 2 (tuning motion for the previous operation of the channel-up key) started at time t2 is stopped, and the tuning motion 3 (tuning motion corresponding to the operation of the channel-up key of this time) for a channel, the virtual channel number of which is larger by 1, is started.

As described above, in the receiver 1 of this embodiment, when the channel-up key is operated, a tuning motion of tuning in to a channel, the virtual channel number of which corresponds to the operation of the channel-up key, is immediately started.

When the receiver 1 judges that the channel-down key is operated in s2, it is judged whether or not it is in the middle of a tuning motion corresponding to the previous operation of the channel-down key (s9). When it is judged that it is in the middle of a tuning motion corresponding to the previous operation of the channel-down key in s9, the tuning motion is stopped (s10). Then, a tuning motion for a channel (tuning motion corresponding to the operation of the channel-down key of this time), the virtual channel number of which is lower by 1, is started (s11). Processing conducted in s9 and s10 is the same as that of s6 and s7 described before. Even when the channel-down key is operated, the receiver 1 immediately starts a tuning motion of a channel, the virtual channel number of which corresponds to the operation of the channel-down key.

When it is judged that the channel-up key or channel-down key is not operated in s1 and s2, the receiver 1 judges whether or not the tuning motion has been completed (s3). When the tuning motion has been completed, the receiver 1 receives a digital broadcasting signal which is being broadcast in a physical channel in which a channel, the virtual channel number of which is indicated, is formed. The digital broadcasting signal, which is being broadcast in the physical channel, contains VCT of the physical channel at predetermined time. Therefore, when the tuning motion has been completed, the receiver 1 receives VCT of the physical channel in which a channel, the virtual channel number of which is indicated, is formed.

When it is judged that a tuning motion has been completed in s3, the receiver 1 judged whether or not VCT has been received (s4). When it is judged that VCT has been received in s4, the channel map 15 is renewed with respect to the physical channel concerned (s5).

Accordingly, even if the channel-up key or channel-down key is continuously operated, the receiver 1 receives VCT when an interval of operation conducted by a user is extended. For example, in the case where the channel-up key is operated at time t3 shown in FIG. 5 and the channel-up key is operated again at time t5 which is after time t4 at which the tuning motion started at time t3 is completed, the receiver receives VCT between t4 and t5, and the channel map 15 is renewed. A period of time between t4 and t5 becomes a renewal chance in which the channel map 15 is renewed.

As described above, the receiver 1 of this embodiment renews the channel map 15 even in the case of a tuning motion in which the channel-up/channel-down function is utilized. Due to the foregoing, in the tuning motion in which the channel-up/channel-down function is utilized, there is no possibility that a virtual channel, in which a program is being broadcast, is not tuned in or a virtual channel, in which a program is not being broadcast, is tuned in. Accordingly, the operation property can be enhanced.

In the receiver 1, when the channel-up key or channel-down key is operated, a tuning motion of tuning in to a virtual channel, the virtual channel number of which corresponds to the operation, is immediately started. Therefore, it is possible to reduce a period of time from the decision of a channel to be tuned in, which is conducted by a user with the channel-up key or channel-down key, to the actual output of images and voices.

As described above, according to the present invention, it is possible to start tuning in to an indicated channel at the time at which the switching of the channel is indicated by the channel-up/channel-down means. Accordingly, it is possible to reduce a period of time from the completion of the operation of tuning in to a channel conducted by a user to the output of images and voices of a program which is being broadcast in the channel which has been tuned in.

Even when the channel is continuously switched by the channel-up/channel-down means, there is a chance in which the channel map is renewed. Accordingly, there is no possibility that a virtual channel, in which a program is being broadcast, is not tuned in or a virtual channel, in which a program is not being broadcast, is tuned in. Accordingly, the operation property can be enhanced.

What is claimed is:

1. A receiver comprising:
    a receiving means for receiving a signal of a program to be broadcast for each virtual channel when multiplex virtual channels are formed in a physical channel and also for receiving a digital broadcasting signal including attribute information showing an attribute of each of the multiplex virtual channels to be broadcast in the physical channel;
    a channel number indicating means for indicating a channel number to be switched;
    a channel selecting means for starting the selecting of a channel corresponding to an indicated channel number at the time at which a channel number to be switched is indicated by the channel number indicating means;
    a channel map storing means for storing a channel map on which attribute information of the virtual channel, which is multiplex in the physical channel, is stored for each physical channel; and
    a channel map renewing means for renewing the channel map, while the channels are being successively switched, when the receiving means receives the attribute information included in the digital broadcasting signal, the channel number indicating means including a channel-up/channel-down means for indicating the order of increasing or decreasing a channel number to be switched, wherein the channel selecting means stops a selecting motion if the channel selecting means is in the middle of selecting a channel corresponding to the channel number indicated before when the channel number to be switched by the channel-up/channel-down means is indicated, and the channel selecting means starts the selecting of a channel corresponding to the channel number indicated this time.

2. A receiver comprising:
    a receiving means for receiving a digital broadcasting signal of a program to be broadcast in a plurality of channels;
    a channel number indicating means for indicating a channel number to be switched; and
    a channel selecting means for selecting a channel corresponding to a channel number indicated by the channel number indicating means, the channel number indicating means including a channel-up/channel-down means for indicating the order of increasing or decreasing a channel number to be switched, wherein the channel selecting means starts the selecting of a channel corresponding to the indicated channel number as soon as the channel number to be switched by the channel-up/channel-down is indicated as the channels are being successively switched.

3. A receiver according to claim 2, wherein the channel selecting means stops a selecting motion if the channel selecting means is in the middle of selecting a channel corresponding to the channel number indicated before when the channel number to be switched by the channel-up/channel-down means is indicated, and the channel selecting means starts the selecting of a channel corresponding to the channel number indicated this time.

4. A receiver according to claim 2, wherein the digital broadcasting signal includes a signal of a program to be broadcast for each virtual channel when multiplex virtual channels are formed in the physical channel.

5. A receiver according to claim 4, wherein the digital broadcasting signal includes attribute information showing an attribute of the virtual channel, and the receiver further comprises a channel map storing means for storing a channel map on which attribute information of the virtual channel, which is multiplex in the physical channel, is stored for each physical channel.

6. A receiver according to claim 5, further comprising a channel map renewing means for renewing the channel map when the receiving means receives the attribute information included in the digital broadcasting signal.

* * * * *